US008985054B2

(12) United States Patent
Lipscomb et al.

(10) Patent No.: US 8,985,054 B2
(45) Date of Patent: Mar. 24, 2015

(54) PET FOUNTAIN WITH BASIN-STRADDLING COVER

(75) Inventors: John M. Lipscomb, Cedarburg, WI (US); Qing He, North Andover, MA (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 368 days.

(21) Appl. No.: 13/276,580

(22) Filed: Oct. 19, 2011

(65) Prior Publication Data

US 2012/0137979 A1     Jun. 7, 2012

Related U.S. Application Data

(63) Continuation-in-part of application No. 12/887,439, filed on Sep. 21, 2010, now Pat. No. 8,899,182, which is a continuation-in-part of application No. 12/474,460, filed on May 29, 2009, now Pat. No. 8,381,685, application No. 13/276,580, which is a continuation-in-part of application No. 29/393,612, filed on Jun. 7, 2011, now Pat. No. Des. 659,300, and a continuation-in-part of application No. 29/393,611, filed on Jun. 7, 2011, now Pat. No. Des. 658,818, and a continuation-in-part of application No. 29/393,610, filed on Jun. 7, 2011, now Pat. No. Des. 659,914.

(60) Provisional application No. 61/244,438, filed on Sep. 21, 2009, provisional application No. 61/356,874, filed on Jun. 21, 2010.

(51) Int. Cl.
*A01K 7/00*     (2006.01)
*A01K 7/02*     (2006.01)
*A01K 45/00*     (2006.01)

(52) U.S. Cl.
CPC ............... *A01K 7/02* (2013.01); *A01K 45/002* (2013.01)
USPC ........................................... 119/74

(58) Field of Classification Search
USPC ............... 119/72, 72.5, 73, 74, 75, 76, 69.5, 119/246–247; 47/65.5, 66.7; 137/560
See application file for complete search history.

(56) References Cited

U.S. PATENT DOCUMENTS

| | | | |
|---|---|---|---|
| 1,158,676 A | 11/1915 | Furber | |
| 3,112,733 A | 12/1963 | Arnott | |
| 3,409,223 A | 11/1968 | Gosh | |
| 3,699,921 A * | 10/1972 | Janicek | 119/246 |
| 3,720,184 A | 3/1973 | Pearce | |
| 3,804,064 A * | 4/1974 | Kuneman et al. | 119/246 |
| 3,901,439 A | 8/1975 | Willis | |
| 4,217,315 A | 8/1980 | Keeler, II | |

(Continued)

*Primary Examiner* — Rob Swiatek
*Assistant Examiner* — Ebony Evans
(74) *Attorney, Agent, or Firm* — Boyle Fredrickson S.C.

(57) ABSTRACT

A pet fountain assembly that includes a cover with a drinking bowl formed therein that straddles a sidewall of a basin that can be user-provided enclosing a pump within a pumping chamber defined therebetween. The cover has a downwardly extending sidewall divided by openings that can be generally U-shaped or V-shaped into a plurality of supports on which the cover. In a preferred embodiment, one of the supports is disposed outboard the basin sidewall resting on the ground and another one of the supports is disposed inboard the basin sidewall resting on a bottom of the basin providing a water passage enabling water from the basin to reach the pump. The inboard support can provide an overflow spillway as well as define a shroud disposed between the pump and water in a lower drinking bowl of the basin. The basin can include an outwardly offset seat that locates the pump.

31 Claims, 4 Drawing Sheets

(56) References Cited

U.S. PATENT DOCUMENTS

| | | |
|---|---|---|
| 4,584,966 A | 4/1986 | Moore |
| 4,721,063 A | 1/1988 | Atchley |
| 4,747,538 A | 5/1988 | Dunn et al. |
| 4,836,142 A | 6/1989 | Duback |
| 4,976,220 A | 12/1990 | Gershman |
| 5,167,368 A | 12/1992 | Nash |
| 5,501,178 A | 3/1996 | Kemp |
| 5,799,609 A | 9/1998 | Burns et al. |
| 5,842,437 A | 12/1998 | Burns |
| 5,845,605 A * | 12/1998 | Malamphy .................. 119/69.5 |
| 6,055,934 A | 5/2000 | Burns et al. |
| 6,079,361 A | 6/2000 | Bowell et al. |
| 6,101,974 A | 8/2000 | Frohlich |
| 6,101,977 A | 8/2000 | Matz |
| 6,142,099 A | 11/2000 | Lange, Jr. |
| 6,206,298 B1 | 3/2001 | Ting |
| 6,257,288 B1 | 7/2001 | Davidian et al. |
| 6,405,937 B1 | 6/2002 | Stukenberg |
| 6,460,483 B1 | 10/2002 | Northrop et al. |
| 6,467,428 B1 | 10/2002 | Andrisin et al. |
| 6,527,257 B1 | 3/2003 | Schuld |
| 6,582,315 B1 | 6/2003 | Formanski |
| 6,622,657 B2 | 9/2003 | Northrop et al. |
| 6,640,747 B2 * | 11/2003 | Reusche ...................... 119/69.5 |
| 6,684,813 B1 * | 2/2004 | Lemon ........................ 119/69.5 |
| 6,739,284 B1 | 5/2004 | Olive |
| 6,928,954 B2 | 8/2005 | Krishnamurthy |
| 6,971,331 B1 | 12/2005 | Rohrer |
| 7,040,249 B1 | 5/2006 | Mushen |
| 7,089,881 B2 | 8/2006 | Plante |
| 7,731,841 B1 | 6/2010 | Tennyson, Jr. |
| 7,757,636 B2 | 7/2010 | McCallum et al. |
| 7,958,844 B1 | 6/2011 | Northrop |
| 8,011,324 B1 | 9/2011 | Warganich |
| 2005/0166853 A1 | 8/2005 | Plante |
| 2006/0174838 A1 | 8/2006 | Plante |
| 2008/0078330 A1 | 4/2008 | McCallum et al. |
| 2010/0300366 A1 | 12/2010 | Lipscomb et al. |
| 2011/0067638 A1 | 3/2011 | Lipscomb et al. |
| 2011/0259273 A1 | 10/2011 | Lipscomb et al. |

* cited by examiner

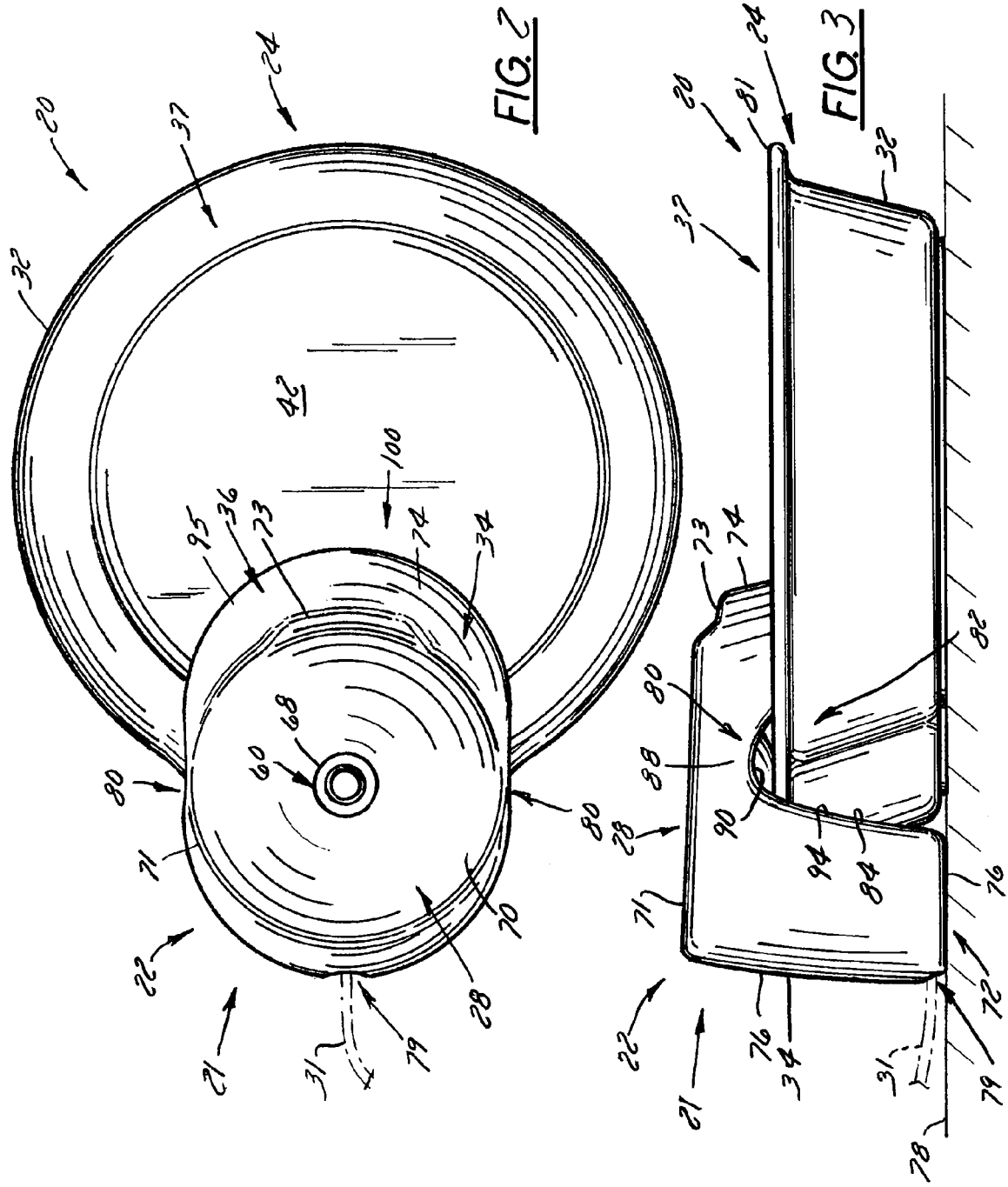

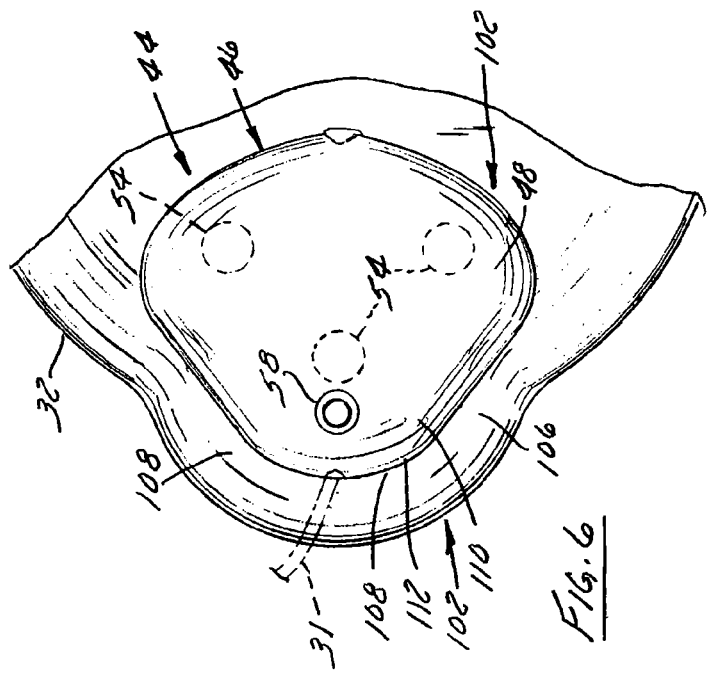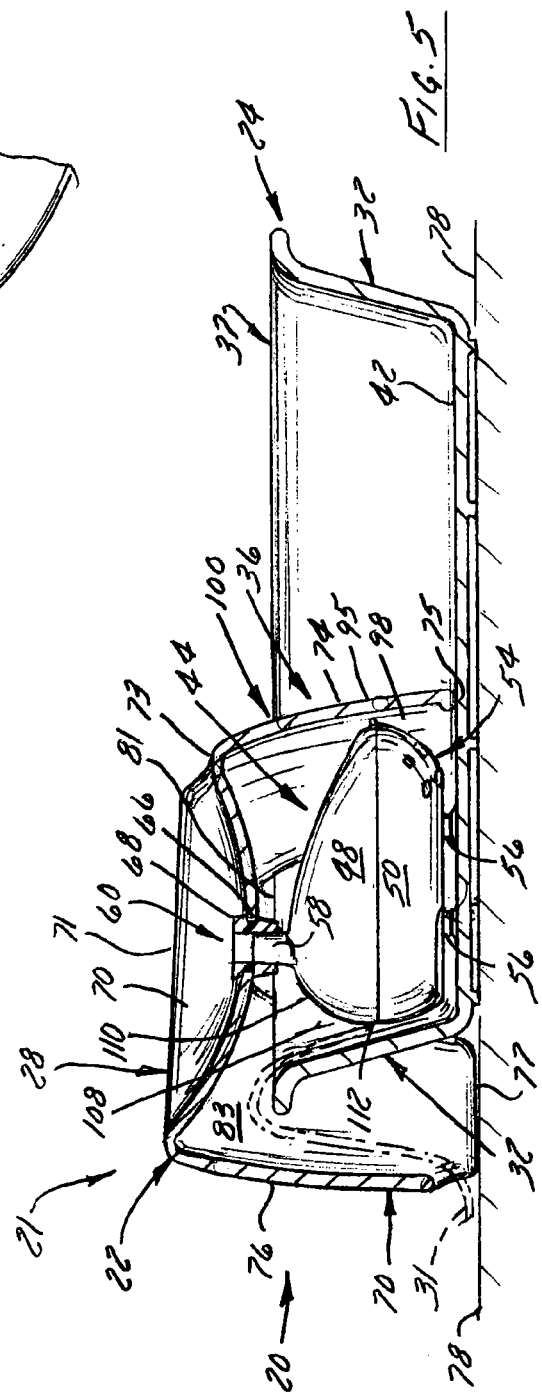

PET FOUNTAIN WITH BASIN-STRADDLING COVER

CROSS REFERENCE

This application is a continuation in part of U.S. patent application Ser. No. 12/474,460, filed May 29, 2009; is a continuation in part of U.S. patent application Ser. No. 12/887,439, filed Sep. 21, 2010, which further claims the benefit of U.S. Provisional Application No. 61/244,438, filed Sep. 21, 2009, and U.S. Provisional Application No. 61/356,874 filed Jun. 21, 2010; and is a continuation in part of each of U.S. Design Application Nos. 29/393,610, 29/393,611, and 29/393,612, all filed Jun. 7, 2011, the entirety of each of which is hereby expressly incorporated herein by reference.

FIELD

The present invention relates generally to pet fountains and more particularly to a pet fountain assembly having a cover that straddles a sidewall of a basin.

BACKGROUND

Pet fountains typically include a basin in which a supply of water is held, a cover, and a pump located between the cover and the basin. In the past, pet fountains have been made of so many components that washing and maintenance have been time consuming and burdensome. As a result, many pet fountains are used for a while by their owners before they quit using them because they are simply too difficult to clean. Many improvements have been made to pet fountains but they still tend to be difficult to clean.

What is needed is a pet fountain formed of a minimum of components, which is easy to assemble, take apart, clean and reassemble, and which facilitates simple and easy electric pump cord routing.

SUMMARY

The present invention is directed to a pet fountain assembly that includes a cover straddling a sidewall of a basin, which can be user-supplied, dividing a sidewall of the cover into at least one support disposed outboard of the basin and at least one other support disposed inboard of the basin. The cover and adjacent portion of the basin sidewall define a pumping chamber in which a pump in liquid flow communication with a drinking bowl of the cover is housed.

The cover sidewall extends generally downwardly from a top wall in which the drinking bowl is formed. The cover sidewall includes a plurality of supports that form a stand upon which the cover rests when straddling the basin sidewall. In a preferred embodiment, the cover sidewall is interrupted by a plurality of basin-sidewall receiving openings through which an adjacent portion of the basin sidewall passes. The basin-sidewall receiving openings divide the cover sidewall into a plurality of the supports with one of the supports disposed inboard of the basin having at least one foot resting on a bottom of the basin and another one of the supports disposed outboard of the basin having at least one foot resting on the ground or floor.

Each basin-sidewall receiving opening can be generally U-shaped or V-shaped and defined by a pair of spaced apart sides that can be side edges which are configured to help guide and locate the cover during straddling placement on the basin. One or both of the opening-defining sides can serve as a stop to help locate or maintain the location of the pump relative to the basin. A mouth of the opening along with the width of the opening upwardly of the mouth is sized to provide play to enable the cover to be placed on the basin while also registering in liquid flow communication with the pump. This same play provides clearance between at least one of the opening sides and an adjacent portion of the basin sidewall defining a liquid flow passage enabling water in the basin to reach the pump.

The inboard support provides a spillway down which water overflowing from the drinking bowl formed in the cover flows during fountain operation. The inboard support can also provide a shroud disposed between an open portion of the basin that defines a lower drinking bowl downstream of the upper drinking bowl formed in the cover that prevents a pet, e.g., cat or dog, from direct access or contact with the pump during fountain operation.

In one preferred embodiment, the bowl and pump form a pet fountain bowl module or assembly that can be pre-packaged for retail sale for use with a customer or user supplied basin. In another preferred embodiment, the bowl, pump and basin are packaged and sold together as a pet fountain assembly. While basin can be a round bowl or dish, one preferred basin embodiment includes an outwardly offset pump well that provides a pump seat that locates the pump during fountain assembly. In one embodiment, the pump is housed in a pump module that can include a filter. The pump or pump module can be releasably coupled by a liquid-conveying coupling conduit that can be of flexible, resilient and elastomeric construction.

The pump or pump module includes mounts, such as suction cups, used to attach the pump or pump module to the pump seat. The cover is maneuvered so that the inboard support is received inside the basin resting on the basin bottom and the outboard support is disposed outside the basin resting on the ground or floor. When the cover is maneuvered and place so it straddles the basin sidewall, the bowl registers in water flow communication with the pump or pump module enabling water pumped from the basin to be discharged into the upper drinking bowl of the cover. Water overflowing from the upper drinking bowl flows down the spillway into the lower drinking bowl of the basin. Water is drawn back into the pump where it is substantially continuously recirculated during fountain operation.

The cover also facilitates routing of the electrical cord of the pump providing a space or passage between a top edge of the basin sidewall and a bottom surface of the cover top wall. A foot of an outboard support includes a cord routing channel that releasably captures part of the pump cord between the foot and the ground or floor.

These and various other features, aspects, and advantages of the present invention will be made apparent from the following descriptions of the drawings and detailed description.

DRAWING DESCRIPTION

The drawings illustrate at least one preferred embodiment presently contemplated for carrying out the invention. In the drawings:

FIG. 2 is a top plan view of the fountain.

FIG. 3 is a side elevation view of the fountain.

FIG. 5 is a cross-sectional view of the fountain.

FIG. 6 is a fragmentary top plan view of a portion of the basin of the fountain illustrating in more detail a pump of the fountain assembly used to recirculate water during fountain operation.

Figure 1:
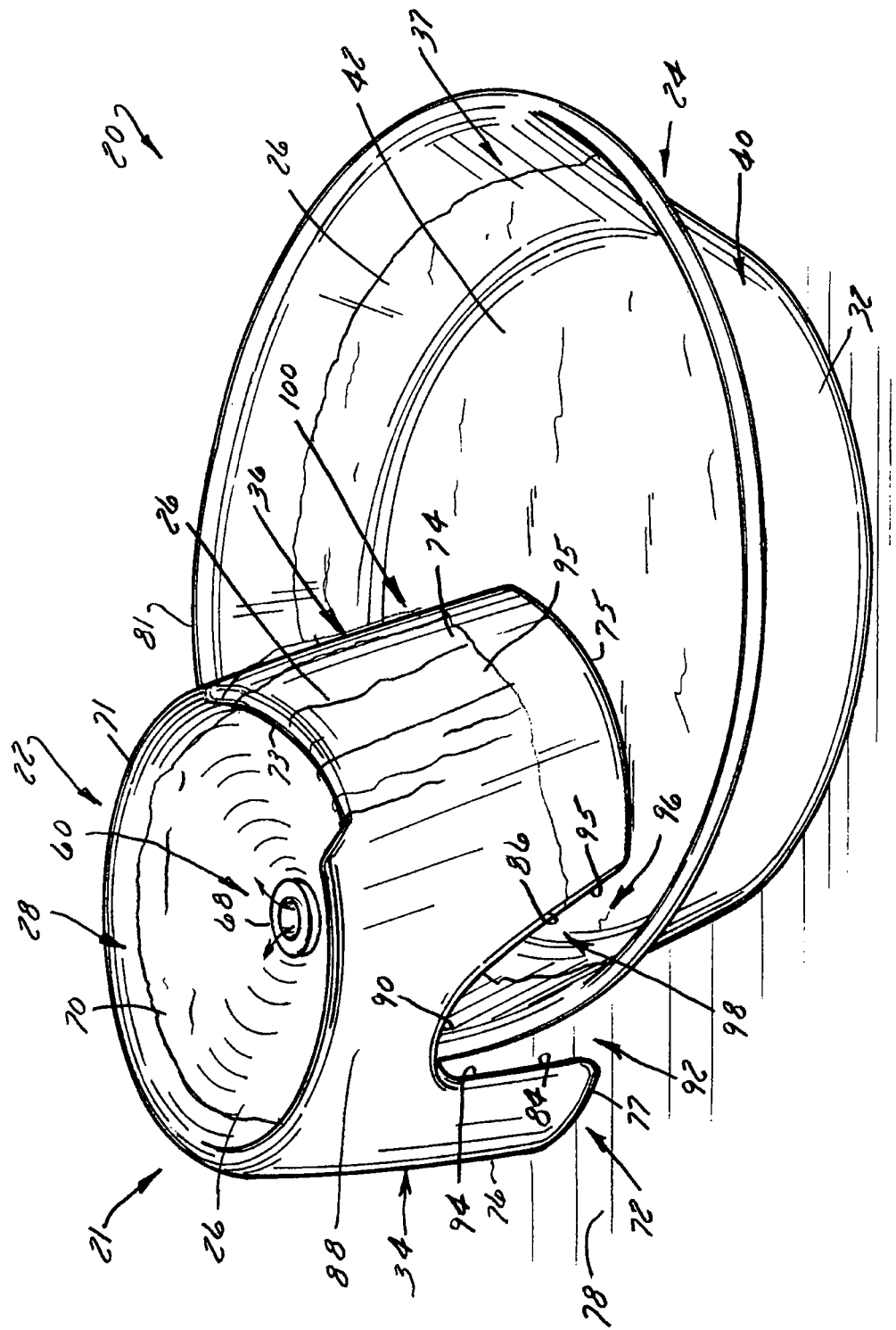
FIG. 1 is a perspective view of a pet fountain formed of an assembly that includes a bowl straddling a basin.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

FIGS. 1-6 illustrate a recirculating pet fountain 20 defined by a fountain assembly 21 that includes an upper drinking bowl 28 integrally formed in a fountain cover 22 that straddles part of a basin 24 that holds water 26 from which a pet, such as a cat or dog, can drink. The drinking bowl 28 receives water 26 pumped by a pump 30 (FIG. 4) from the basin 24 enabling the pet to drink from water 26 in the bowl 28 or from water 26 in the basin 24. The cover 22 has a sidewall 34 extending downwardly from the bowl 28 that is configured to straddle an upwardly extending sidewall 32 of the basin 24 in a manner that locates the pump 30 within the basin 24 and substantially encloses the pump 30. During operation, the pump 30 recirculates water 26 by pumping it from the basin 24 into the bowl 28 in the cover 22 where it then flows down a spillway 36 formed by part of the cover sidewall 34. Water 26 flowing down the spillway 36 flows into an open portion of the basin 24 that defines a lower drinking bowl 37 from which the pet can also drink.

In a preferred embodiment, the spillway 36 is inclined at an angle relative to the basin bottom 42 so that water 26 overflowing from the bowl 28 quietly flows down the spillway 36 into the basin 24 below. For example, the spillway 36 can form an obtuse included angle with the generally horizontal basin bottom 42 helping ensure overflowing water 26 flows smoothly and preferably with laminar flow into the basin 24.

Figure 4:
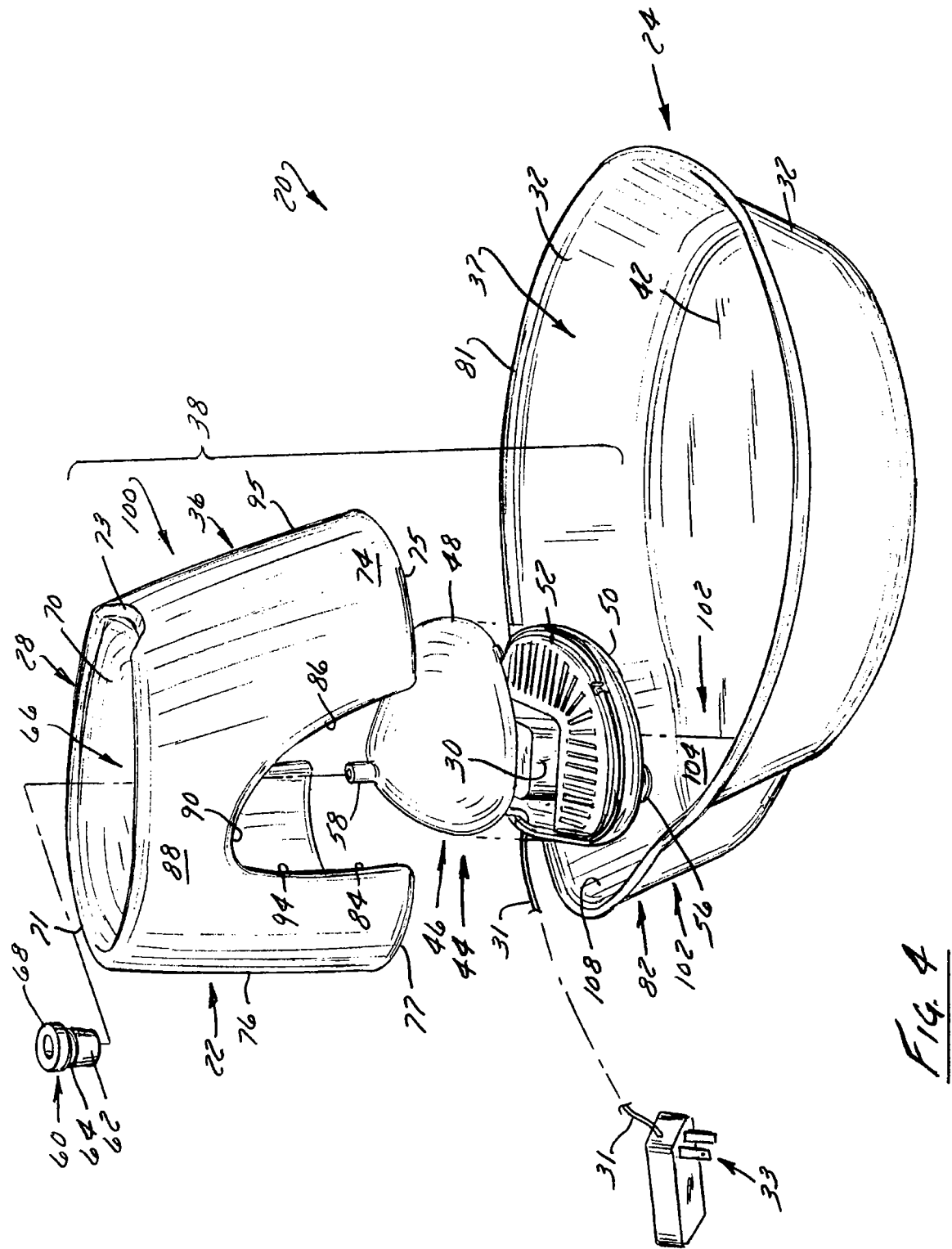
FIG. 4 is a perspective exploded view of the fountain assembly.

With reference to FIG. 4, the cover 22 and pump 30 can form an add-on fountain bowl module or assembly 38 that can be pre-packaged for sale to and use by a consumer or purchaser, e.g., user, with the basin being provided by the consumer or purchaser. For example, basin 24 can be a user-provided bowl or dish 40, such as the generally round bowl depicted in FIG. 1, having a bottom 42, e.g., bottom wall, from which the basin sidewall 32 upwardly extends. In one preferred embodiment, the cover 22 and pump 30 form a recirculating pet fountain bowl assembly 38 that is prepackaged for sale and use by a consumer or purchaser that supplies their own basin 24, such as in the form of a bowl 40 already in the possession of the consumer or purchaser. In another preferred embodiment, the cover 22, basin 24 and pump 30 are packaged and sold together as a substantially complete pet fountain assembly 21.

With reference to FIGS. 4-6, the pump 30 can be part of a pump module 44 having a housing 46 that can be formed of a plurality of snap-together sections 48 and 50, e.g., top and bottom housing halves, which can include a filter 52. Such a filter 52 can filter particulates and can include activated charcoal or the like. The pump 30 is a submersible electrically powered pump, such as a submersible aquarium pump or the like. As is best shown in FIGS. 4-6, the electrically powered pump 30 includes an electrical cord 31 that is routed between the cover 22 and the basin 24 when the fountain 20 is assembled. The electrical cord 31 terminates in a dual-pronged plug 33, which can include a transformer, that is plugged into a standard utility powered electrical socket providing electrical power ranging from between about 100 V AC and about 240 V AC. One of the module housing sections, such as the bottom section or half 48, can be formed to include an integral perforate intake grate 54 (FIG. 5) through which water 26 in the basin 24 flows before being pumped by the pump 30 into the upper bowl 28 of the cover 22. Mounts 56, such as suction cups, can be used to removably attach the pump module 44 to the bottom 40 of the basin 24. Such mounts 56 can be in the form of flexible and resilient suction cups, e.g., elastomeric suction cups, which can extend outwardly from housing section 48 in the manner depicted in FIGS. 4-6.

Another module section, such as the top section or half 50, includes an outwardly extending tubular outlet 58 that telescopically engages a flexible, elastomeric coupling conduit 60 that not only conveys water discharged by the pump 30, but which also releasably couples the cover 22 to the pump 30, e.g., pump module 44. Where the pump 30 is used without a pump module 44, the coupling conduit 60 telescopically engages a tubular outlet (not shown) of the pump 30.

As is best shown in FIGS. 4 and 5, the coupling conduit 60 can be formed of a flexible and resilient material, e.g., an elastomer, which includes a tubular body 62 with an annular seating channel or groove 64 in registry with part of the drinking bowl 28 that defines an opening 66 sealed by a lip 68 of the coupling conduit 60 when attached to the cover 22. When the pump module 44 is attached to the bottom 42 of the basin 24 and the coupling conduit 60 is coupling the cover 22 to the pump module 44, the cover 22 is removably anchored to the basin 24 while also helping locate the cover 22 relative to the basin 24. Where the coupling conduit 60 is attached directly to the pump 30, such as when the pump 30 is used without any pump module or pump module housing, the pump 30 has mounts, e.g., suction cups, which attach to the basin bottom 42 and the conduit 60 removably anchors the cover 22 to the pump 30.

With reference to FIG. 5, the cover 22 has a top wall 70 of recessed or concave construction integrally forming the drinking bowl 28. The bowl 28 is defined by an upraised rim 71 about its periphery interrupted by a recessed flow guide 73 that guides water 26 overflowing from the bowl 28 down the spillway 36 into the basin 24 below. The cover sidewall 34 extends downwardly from the top wall 70 defining a stand 72 straddling the basin sidewall 32 upon which the cover 22 is self-supported. The cover sidewall 34 is divided into a plurality of supports 74 and 76 with one of the supports 74, e.g., inboard support 74, disposed in the basin 24 and another one of the supports 76, e.g., outboard support 76, disposed outside the basin 24. When the cover 22 is assembled, the cover sidewall 34 straddles the basin sidewall 32 with one of the cover supports 74 disposed in the basin 24 having a foot 75 that can be elongate resting on the basin bottom 42 and another one of the cover supports 76 disposed outside the basin 24 having a foot 77 that also can be elongate resting on the floor 78, e.g., ground. In the preferred embodiment shown in the drawings, the cover 22 has a pair of supports 74 and 76 formed by its sidewall 70 with the inboard support 74 resting on the basin bottom 42 inside the basin 24 and the outboard support 76 resting on the floor 78 outside of the basin 24.

With reference to FIGS. 2-5, the outboard foot 77 includes a cord channel 79 formed therein through which the electrical pump cord 31 is routed. When the cover 22 is placed on the basin 24 with the cord 31 routed through the channel 79, the cord 31 is held captive between the outboard foot 77 and the floor 78. As is shown in FIG. 5, when the cover 22 is placed on the basin 24, space between the top wall 70 of the cover 22 and a top edge 81 of the basin sidewall 32 provides a cord routing passage 83 therebetween enabling the cord 31 to pass therebetween and be releasably captured between the outboard foot 77 of the cover 22 and the floor 78.

The cover supports 74 and 76 are divided by an opening 80 that can be a slot or a notch of generally U-shaped or V-shaped downturned construction, such as depicted in FIGS. 1, 3 and 4, through which a portion 82 of the basin sidewall 32 passes. In the preferred fountain embodiment shown in the drawings, the cover sidewall 70 has a pair of spaced apart openings 80 (only one of which is shown) through which the underlying basin sidewall portion 82 extends. As is best depicted by FIG. 2, the openings 80 can be generally aligned and disposed on opposite sides of the cover sidewall 70.

Each opening 80 is defined by a pair of side edges 84 and 86 spaced apart to receive part of the basin sidewall 32 therebetween. In a preferred embodiment, at least one of the side edges 84 and/or 86 provides a stop or locator that helps keep the cover 22 in place during fountain operation by bearing against an adjacent portion, e.g., sidewall portion 82, of the basin sidewall 32. By providing such a stop or locator, one or both side edges 84 and/or 86 also help maintain the position of the pump 30, e.g., pump module 44, without the cover 22 being directly attached to the basin 24. Providing such a stop or locator also helps guide the cover 22 into proper position during assembly onto the basin 24.

The side edges 84 and 86 that define the basin sidewall receiving opening 80 can be interconnected by the top wall 70 of the cover 22 as well as a bridging portion 88 of the sidewall 34. Where the basin sidewall receiving opening 80 is generally U-shaped or V-shaped, side edges 84 and 86 can converge at or along the bridging portion 88 to define an apex 90 of curved construction generally overlying part of the basin 24 such as the basin sidewall 32 and part of the basin bottom 42. The side edges 84 and 86 generally define an acute included angle therebetween as exemplified in FIG. 1 with at least one of the side edges providing a locator that locates the cover 22 relative to the basin 24 during placement of the cover 22 over an adjacent portion 82 of the basin sidewall 32 during assembly. In the preferred embodiment shown in the drawings, both side edges 84 and 86 provide opposed locators or stops that locate the cover 22 relative to the basin 24 via contact, e.g., sliding contact, between the basin sidewall 32 and an adjacent one of the side edges 84 or 86 as the basin 24 is being lowered into place. The acute included angle defined by the side edges 84 and 86 spaces them apart far enough at the mouth 92 of each basin sidewall receiving opening 80 to accommodate a wide variety of basins, e.g., basin 24, of different sizes, sidewall heights, sidewall thicknesses, and sidewall configurations, enabling the cover 22 to be used with off-the-shelf or user supplied basins or bowls.

When assembled to the basin 24, the converging side edges 84 and 86 of the opening 80 keep the cover 22 generally seated in place with the outboard edge 84 providing a stop 94 that helps keep the cover 22 in place during fountain operation. As is best depicted in FIG. 5, such an outboard stop 94 can also help hold or retain the pump 30, e.g., pump module 44, in place during fountain operation because the inboard support 74 bounds or encompasses the pump 30. Such a stop 94 can also function as a locator to help ensure proper location of the pump 30 or pump module 44 during fountain assembly. The outboard stop 94 is also elongate and can also function as an assembly guide to slidably guide the basin sidewall 32 into the sidewall receiving opening 80 during placement of the cover 22 on the basin 24.

The inboard edge 86 likewise provides an inboard stop 95 that can also help keep the cover 22 in place during fountain operation. Such an inboard stop 95 can also be elongate and can function as an assembly guide that slidably guides the basin sidewall 32 into opening 80 during placement of the cover 22 on the basin 24. One of the side edges, such as inboard edge 86, can be curved and converge toward the other side edge, such as outboard edge 84, to help smoothly guide the cover 22 into place during assembly so it straddles the basin sidewall 32.

Where the pump 30 is part of a module, such as pump module 44, the inboard support 74 forms a shroud 95 that can be curved or arcuate along its transverse extent and that overlies the pump 30 with the pump 30 being disposed between the support 74 and an adjacent portion of the basin sidewall 32. When the cover 22 is assembled so it straddles the basin sidewall 32, the shroud 95 overlies the pump 30 and prevents a pet drinking from water 26 in the basin 24 or flowing down the spillway 36 from being able to directly contact the pump 30.

At least one opening 80 also provides clearance between the inboard support 74 and adjacent portion, e.g., sidewall portion 82, of the basin sidewall 32 defining a passage 96 enabling water 26 in the basin 24 to flow therebetween and into a pumping chamber 98 of a pumping chamber housing 100 defined by the portion of the cover 22 overlying the pump 30 and disposed in the basin 24. In the preferred fountain embodiment shown in the drawings, each opening 80 is sized to provide sufficient clearance to enable water 26 in the basin 24 to flow through a corresponding water flow passage 96 into the pumping chamber 98 so the water 26 can get drawn into the pump 30 during fountain operation.

In the preferred fountain embodiment shown in the drawings, the outboard support 76 can be transversely formed, e.g., curved, so as to substantially complementarily conform or follow the contour of at least part of an adjacent portion 82 of the basin sidewall 32. The inboard support 74 encompasses or overlies part of the pump 30, e.g., pump module, so as to help house or enclose it within the cover 22. If desired, the inboard support 74 can also be formed, e.g. curved, so as to substantially complementarily conform or follow part of the contour of the pump module 44. For example, as is depicted in the drawing figures, the cover 22 can be generally round with the cover sidewall 70 being generally round extending downwardly interrupted by basin sidewall receiving openings 80 that divide the sidewall 70 into the inboard and outboard supports 74 and 76 upon which the cover 22 rests when assembled. To help impart stability, each support 74 and 76 can be configured with an elongate and generally C-shaped foot 75 and 77.

As is best shown in FIGS. 4 and 6, the basin 24 can be formed so as to deviate from round or circular having an outwardly extending pump well 102 that defines a pump locator seat 104 for receiving and properly locating the pump 30 and/or pump module 44 when assembling the fountain 20. As is best shown in FIG. 6, the basin sidewall 32 has an outwardly extending segment 106 encircling or encompassing an outer portion of the pump locator seat 104 providing an outer locator surface 108 against which a portion of the pump 30, e.g., pump module 44, can be received in helping to properly locate the pump 30 and/or pump module 44 during assembly. For example, where a pump module 44 is used, a narrower discharge end 110 of the module housing 46 abut against the outer locator surface 108 provided by the outwardly extending basin sidewall segment 106 to help properly locate the pump module 44 so that the coupling conduit 60 (FIG. 5) will telescopically engage the tubular outlet 58 when the cover 22 is placed over the basin 24 during fountain assembly. In a preferred embodiment, the outwardly extending basin sidewall segment 106 is curved so as to complementarily conform to a similarly curved peripheral portion 112 of the narrower discharge end 110 of the pump module 44. If desired, the well 102 and locator seat 104 can be modified to follow the contour of the pump 30, e.g., such as by being generally square or generally rectangularly shaped, where a pump 30 is used without any pump module 44.

During assembly, the coupling conduit 60 is inserted into the opening 66 in the top wall 70 of the drinking bowl 28 until part of the bowl 28 defining the opening 66 seats in the channel 64 attaching the conduit 60 to the cover 22. The pump 30 or pump module 44 is maneuvered into the pump well 102 until its mounts 56, e.g., suction cups, engage the well 102 releasably securing the pump 30 or pump module 44 in place. The pump 30 or pump module 44 is maneuvered so it is disposed adjacent, or even in contact with, a portion of the outer locator surface 108 formed by the well-defining outer basin sidewall segment 106 helping to more accurately locate the tubular outlet 58 so it will telescopically engage the coupling conduit 60 during assembly of the cover 22.

The cover 22 is maneuvered over the pump well 102 with its openings 80 facing downwardly so each one of the basin sidewall receiving openings 80 receives a respective adjacent portion 82 of the basin sidewall 32 when the cover 22 is lowered. As the cover 22 is lowered, one or more of the side edges 84 and/or 86 that define each opening 80 can slidably contact part of the basin sidewall 32 helping to guide and locate the cover 22 relative to the basin 24 and the pump 30 and/or pump module 44. The width or spacing between the side edges 84 and 86 is greater than the width or thickness of the basin sidewall 32 providing sufficient amount of play between the cover 22 and basin 24 during assembly to enable a user to be able to move the cover 22 toward or away from the basin sidewall 32 as needed in order for the coupling conduit 60 to telescopically engage the tubular outlet 58 of the seated pump 30 and/or pump module 44 during assembly. When the coupling conduit 60 telescopically engages the tubular outlet 58 of the seated pump 30 and/or pump module 44, the cover 22 can be lowered as desired until the feet 75 and 77 of the respective supports 74 and 76 respectively rest on the basin bottom 42 and floor 78.

With the cover 22 straddling the basin sidewall 32 and coupled by the coupling conduit 60 to the pump 30 or pump module 44 that is in turn mounted to the basin bottom 42, the cover 22 is anchored to the basin 24 completing fountain assembly. Once water 26 is added to the basin 24 and the pump 30 plugged into an electrical outlet (not shown), the pump 30 draws water 26 from the lower bowl 37 of the basin 24 through one or both passages 96 between the inboard support 74 and basin sidewall 32 into the pumping chamber 98 defined by the inboard support 74 and adjacent portion 82 of the basin sidewall 32, which can include pump well 102. Water 26 from the pumping chamber 98 is expelled out the coupling conduit 60 into the top bowl 28 where it pools until the water 26 overflows down the spillway 36 formed by the outer surface of the inboard support 74.

In a preferred embodiment, the cover 22 and basin 24 are formed of porcelain providing additional weight to the cover 22 that can help to keep the cover 22, as well as the pump 30, e.g., pump module 44, in place during pump operation. The shroud 95 formed by the inboard support 74 encompasses or encircles the pump 30, e.g., pump module 44, which not only helps keep a pet from directly contacting the pump 30, e.g., pump module 44, but which also helps keep the pump 30, e.g., pump module 44, from walking during pump operation by forming part of a pumping chamber housing 100 substantially enclosing the pump 30, e.g., pump module 44. By straddling the basin sidewall 32, the outboard stop 94 formed by the outboard edge 84 of the outboard support 76 can cooperate with the basin sidewall 32 by bearing against the sidewall 32 in doing so. The use of porcelain in combination with the angled spillway 36 directs flow toward the basin sidewall 32 in a manner that helps keep the basin 24 clean.

While the preferred fountain embodiment shown in the drawings depicts the pump 30 disposed in a housing 46 of a pump module 44, a pet fountain bowl assembly 38 and/or pet fountain 20 constructed in accordance with the present invention can be used where the pump 30 is not disposed in any module or housing or is disposed in a module having a different shape or configuration. While the preferred fountain embodiment shown in the drawings includes a coupling conduit 60 used to releasably couple the cover 22 to the basin 24 while providing water flow communication between the pump 30 and upper drinking bowl 28, the fountain assembly 21 can be configured so that the cover 22 straddles the basin sidewall 34 during assembly in a manner that registers the bowl 28 in water flow communication with a discharge outlet 58 of the pump module 44 or the discharge outlet of the pump 30, such as where a pump is used without being housed in any module.

Understandably, the present invention has been described above in terms of the preferred embodiment. It is recognized that various alternatives and modifications may be made to these embodiments which are within the scope of the appended claims.

What is claimed is:

1. A pet fountain assembly comprising:
    a water-holding basin having a bottom and an upwardly extending sidewall;
    a cover straddling the basin sidewall and comprising a drinking bowl in water flow communication with the basin, the cover comprising a plurality of spaced apart and generally downwardly extending supports with one of the supports comprising an inboard support disposed in the basin with the inboard support having a foot upon which the inboard support rests that is disposed inside the basin sidewall and another one of the supports comprising an outboard support disposed outside the basin with the outboard support having a foot upon which the outboard support rests that is disposed outside the basin sidewall; and
    a pump in water flow communication with the basin and the drinking bowl.

2. The pet fountain assembly of claim 1 wherein the foot of the inboard support rests on the bottom of the basin.

3. The pet fountain assembly of claim 1 wherein foot of the outboard support rests on a portion of a ground or floor upon which the basin rests.

4. The pet fountain assembly of claim 1 wherein the inboard support and an adjacent portion of the basin sidewall define a pumping chamber housing the pump.

5. The pet fountain assembly of claim 4 wherein basin comprises a pump well defined by an outwardly extending portion of the basin sidewall that defines a pump locator seat that locates the pump underneath the drinking bowl of the cover.

6. The pet fountain assembly of claim 4 wherein the basin comprises a lower drinking bowl spaced from the cover drinking bowl and wherein inboard support comprises a shroud disposed between water in the basin drinking bowl and the pump.

7. The pet fountain assembly of claim 1 wherein the inboard support comprises a spillway down which water overflowing the drinking bowl flows into the basin.

8. The pet fountain assembly of claim 7 wherein the spillway is inclined at an angle relative to the basin bottom.

9. The pet fountain assembly of claim 1 wherein the cover comprises a downwardly extending sidewall having an opening formed therein through which the basin sidewall passes, the opening in the cover sidewall defining the plurality of supports including the inboard support and the outboard support.

10. The pet fountain assembly of claim 9 wherein the opening defines a water flow passage between the cover sidewall and the basin sidewall through which water in the basin flows to reach the pump.

11. The pet fountain assembly of claim 1 further comprising a coupling conduit underlying the cover that couples the cover to the pump, the coupling conduit attached at or adjacent one end to the cover with the coupling conduit having a lip that seals about an opening formed in the cover when the coupling conduit is attached to the cover.

12. The pet fountain assembly of claim 11 wherein the pump is carried by a pump module housing in telescopic engagement with the coupling conduit.

13. The pet fountain assembly of claim 1 wherein the pump is disposed in the basin anchoring the cover to the basin and pumping water from the basin into the drinking bowl with water overflowing the drinking bowl flowing back into the basin.

14. The pet fountain assembly of claim 1 wherein at least a portion of the drinking bowl is disposed outwardly of the basin sidewall.

15. The pet fountain assembly of claim 14 wherein at least a portion of the basin is open defining a drinking bowl in the basin.

16. The pet fountain assembly of claim 15 wherein the pump is coupled to the cover and pumps water into the drinking bowl of the cover with water overflowing the drinking bowl of the cover flowing into the basin.

17. The pet fountain assembly of claim 1 wherein one portion of the drinking bowl of the cover is disposed outwardly of the basin sidewall, and wherein another portion of the drinking bowl of the cover is disposed inwardly of the basin sidewall and overlies part of the bottom of the basin.

18. The pet fountain assembly of claim 17 wherein at least a portion of the basin adjacent the cover is open defining a drinking bowl in the basin, and wherein the inboard support comprises a spillway down which water overflowing the drinking bowl of the cover flows into the drinking bowl in the basin.

19. A pet fountain assembly comprising:
a water-holding basin having a bottom and an upwardly extending sidewall;
a cover straddling the basin sidewall and comprising a drinking bowl in water flow communication with the basin; the cover having a downwardly extending sidewall with a pair of spaced apart, downwardly facing, and generally U-shaped or generally V-shaped elongate openings formed therein, with a portion of the basin sidewall passing through the openings and dividing the cover sidewall into a plurality of spaced apart supports with one of the supports comprising an outboard support disposed outside the basin and another one of the supports comprising an inboard support disposed inside the basin with the inboard support comprising a spillway down which water flows into the basin; and
a pump in water flow communication with the basin and the drinking bowl.

20. The pet fountain assembly of claim 19 wherein at least one of the openings is wider than the basin sidewall providing play between the cover and basin sidewall that facilitates engagement of the cover to the pump.

21. The pet fountain assembly of claim 20 wherein the pump is coupled to the cover by a coupling conduit in water flow communication therewith.

22. The pet fountain assembly of claim 21 wherein the coupling conduit is comprised of a flexible elastomeric material.

23. The pet fountain assembly of claim 22 wherein the pump is received in a pump module housing in telescopic engagement with the coupling conduit.

24. The pet fountain assembly of claim 19 wherein the outboard support rests on a floor or ground surface outside the basin and the inboard support rests on the basin bottom.

25. The pet fountain assembly of claim 24 wherein the inboard support and an adjacent portion of the basin sidewall define a pumping chamber housing the pump.

26. The pet fountain assembly of claim 19 wherein at least one of the openings in the cover sidewall is wider than the basin sidewall providing a clearance space between the cover sidewall and basin sidewall defining a passage therebetween through which water in the basin flows underneath part of the cover.

27. The pet fountain assembly of claim 26 wherein the pump underlies part of the cover and is releasably attached to the bottom of the basin by at least one suction cup releasably anchoring the cover to the basin.

28. The pet fountain assembly of claim 19 wherein at least a portion of the drinking bowl is disposed outboard of the basin sidewall.

29. A pet fountain assembly comprising:
a water-holding basin having a bottom and an upwardly extending sidewall;
a pump disposed in the basin;
a cover having a drinking bowl in water flow communication with the pump, the cover having a downwardly extending sidewall comprising a plurality of spaced apart supports straddling the basin sidewall with one of the supports comprising an outboard support disposed outside the basin resting on a floor or ground surface and another one of the supports comprising an inboard support disposed inside the basin resting on the basin bottom that defines a spillway in water flow communication with water in the basin.

30. The pet fountain assembly of claim 29 wherein the cover comprises a top wall, wherein the inboard support is spaced from an adjacent portion of the basin sidewall defining a water flow passage therebetween, and wherein the cover top wall, inboard support and adjacent portion of the basin sidewall comprise a pumping chamber enclosing the pump.

31. The pet fountain assembly of claim 30 wherein the basin comprises a lower drinking bowl spaced from the cover drinking bowl and wherein inboard support comprises a shroud disposed between water in the basin drinking bowl and the pump.

* * * * *